3,347,929
HALOGENATED PHENOXYCYCLOPENTENONES AND PROCESSES THEREFOR

Edward D. Weil, Lewiston, and Jerome Linder, Niagara Falls, N.Y., assignors to Hooker Chemical Corporation, Niagara Falls, N.Y., a corporation of New York
No Drawing. Filed Oct. 29, 1962, Ser. No. 233,873
20 Claims. (Cl. 260—590)

This invention relates to new and useful aromatic cycloaliphatic ketone-ethers, processes for the production thereof, and methods for the use thereof as intermediates and as fungicides and bactericides.

The compounds of this invention have the general formula:

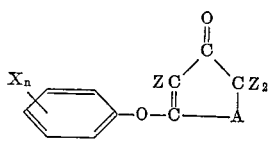

where Z is a halogen of atomic weight between 35 and 81, and where A is selected from the group consisting of —$CZ_2$— and —(C=O)— and where X is a substituent selected from the group consisting of halogen, nitro, alkyl, phenyl, alkoxy, and carboxy, and $n$ is an integer from 0 to 5; $X_n$ may in addition represent a benzo radical (—CH=CH—CH=CH—) fused to the phenyl ring to form the naphthyl radical.

Specific examples of compounds of this invention are:

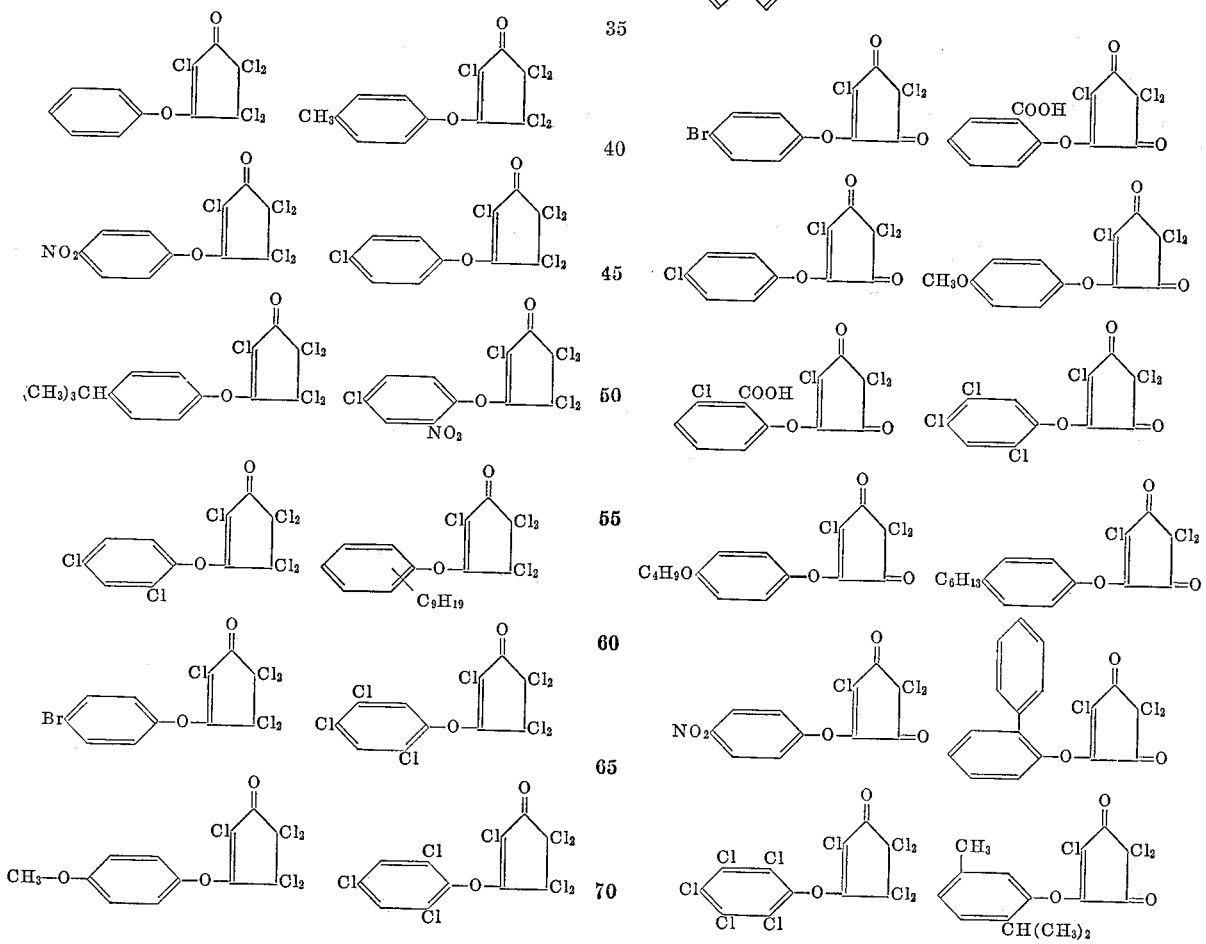

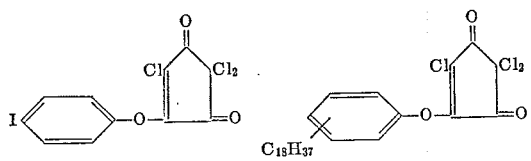

These specific examples are merely illustrative and the present invention is by no means limited thereto.

The compounds of this invention are made by contacting in the liquid phase, a ketone of the structure:

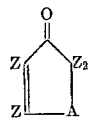

where A and Z are as previously defined with a phenolic compound of the structure:

where X and $n$ are as previously defined.

Preferred ketones from the standpoint of cost and availability are tetrachlorocyclopentene-3,5-dione and hexachloro-2-cyclopentenone, though any ketone corresponding to the formula above may be used. No particular preference is had for phenols and any corresponding to the generic formula above is suitable. The preferred halogen which is substituted on the phenolic compound and on the ketone for reasons of economics and ease of synthesis of starting materials is chlorine.

There is no criticality regarding the concentration of either the ketone or phenolic compound, but the reactants are preferably used in equimolar amounts or with the ketone in excess.

The reactants will react to some degree when admixed as aforesaid, but it is preferred to conduct the reaction in the presence of about one mole of an acid acceptor (base) per mole of phenolic compound. The acid acceptor (base) is believed to form the phenolate salt of the phenolic compound, said salt being the reactive moiety. We do not wish to be held to a theory of the mechanism of the reaction; the base employed may function either as an acceptor of the liberated HX or it may serve to form the phenoxide anion or both. Suitable bases are sodium or potassium hydroxide, carbonate, phenate, sodium metal, magnesium hydroxide, calcium hydroxide, lithium hydroxide, pyridine, quinoline, triethylamine, N-methyl morpholine, N,N-dimethyl aniline, N,N-diethyl aniline, or any other basic tertiary amine. Not much more than one mole of acid acceptor (base) should be used however, because excess amounts may react with the product. Where X is carboxy, an extra mole of base is used for each X group.

The reaction can be conducted from temperatures from about ambient up to about 200 degrees centigrade. At lower temperatures, the rate is too low to be practicable; and at higher temperatures, tars and by-product materials are formed. The reaction is operable at sub- or super-atmospheric pressures, but is preferably run at or near atmospheric pressure.

The use of a solvent is not necessary, but solvents may conveniently be employed. Excess ketone or phenolic compound may be used as a solvent. Other convenient solvents include aliphatic or aromatic hydrocarbons, chlorocarbons, ethers, alcohols, ketones, or esters.

No catalyst is necessary for the practice of this invention, although with some of the more slowly reacting phenols, such as certain nitro phenols, a catalytic amount of copper or copper salt may be found to have an accelerating effect on the rate of the reaction.

Reaction times ranging from several minutes to several hours are conveniently employed. Generally, the reaction can be terminated when titration of an aliquot shows that substantially one mole of equivalent halide has been liberated.

The compounds of this invention may be isolated by distillation or crystallization from the reaction mixture. In most cases, the salt formed by reaction of the liberated HX with the base employed may be removed by filtration or by washing the reaction mixture with water.

The products of this invention are useful as chemical intermediates and for the control of fungi and bacteria as is hereinafter shown. As intermediates, the compounds of this invention undergo ring opening reactions with bases to form new herbicidal carboxylic acids, as follows:

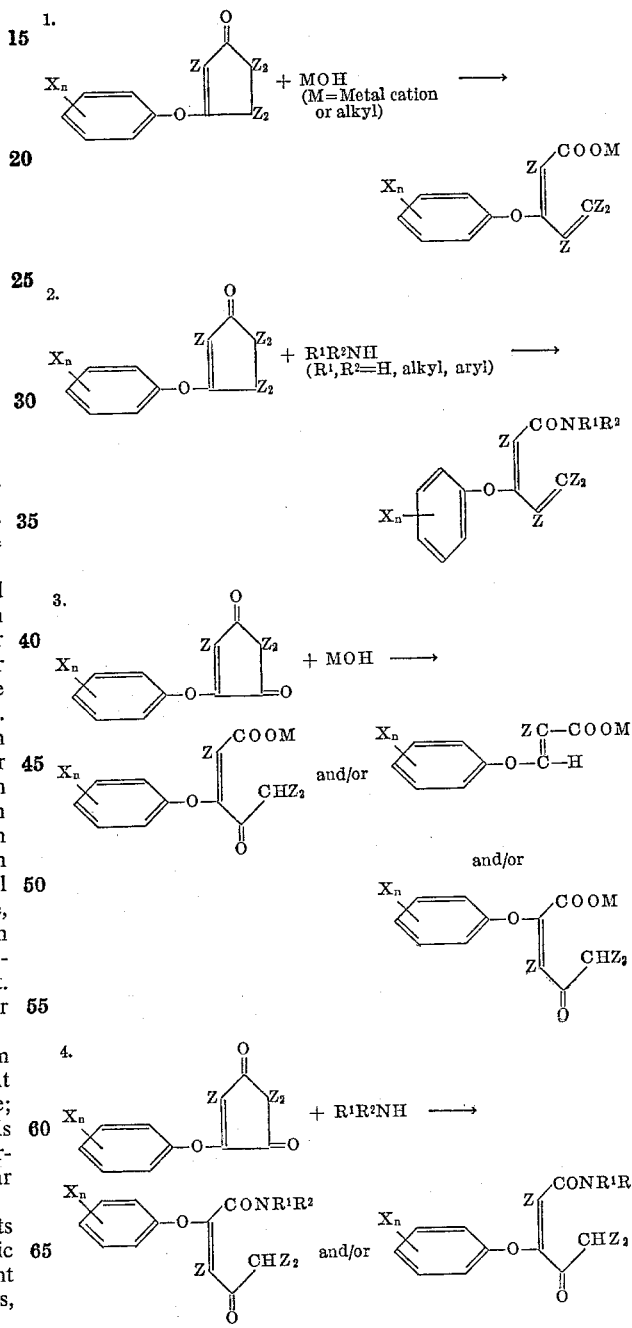

The preparation of the various embodiments of the invention are described hereinafter.

*Example 1.—Preparation of 3-(2,4-dichlorophenoxy)-2,4,4,5,5-pentachloro-2-cyclopentenone*

A mixture containing 10 parts of sodium hydroxide in 20 parts of water is added to 82 parts of 2,4-dichlorophenol at 40° C. This solution is then added to a mixture containing 82 parts of 2,4-dichlorophenol and 145 parts of hexachloro-2-cyclopentene-1-one. The entire mixture is heated on a steam bath. After 3 hours, 11.7 parts of chloride were found out of a theoretical amount of 14.6 parts. The mixture was distilled to a pot temperature of 160 degrees centigrade at 0.1 mm. The undistilled material was dissolved in hexane, filtered to remove any salts and crystallized from hexane giving a 50 parts of a crystalline solid which melted at 70.5 to 73 degrees centigrade.

*Analysis.*—Calcd. for $C_{11}H_3Cl_7O_2$: Cl, 59.8. Found: 59.8.

In a similar manner, the following 3-aryloxy-2,4,4,5,5-pentachloro-2-cyclopentenones were made from hexachloro-2-cyclopentenone.

*Example 11.—Preparation of 1-(2,4-dichlorophenoxy)-2,4,4-trichlorocyclopentene-3,5-dione*

A mixture containing 117 parts of tetrachloro-4-cyclopentene-1,3-dione and 326 parts of 2,4-dichlorophenol is added to a solution containing 51 parts of N-methylmorpholine in 326 parts of 2,4-dichlorophenol. This mixture is heated for 36 hours at 100 to 110 degrees centigrade. The excess dichlorophenol is distilled off and the resulting material is dissolved in benzene and filtered to remove any salts which formed. The benzene solution is partially evaporated. A crystalline solid came out which on further crystallization from benzene melted at 150 to 150.5 degrees centigrade.

*Analysis.*—Calcd. for $C_{17}H_6Cl_4O$: Cl, 43.6. Found: 43.3.

| Ex. | Aryl Group | Phenol Used | Base Used | M.P., °C. | Cl Theory | Found |
|---|---|---|---|---|---|---|
| 2 | $C_6H_5$ | $C_6H_5ON$ | NaOH | 66.5–67.5 | 51.2 | 51.2 |
| 3 | ⌬–CH₃ | ⌬(OH)(CH₃) | Et₃N (Et=ethyl) | Oil | 49.3 | 48.9 |
| 4 | CH₃–⌬ | CH₃–⌬–OH | Et₃N | Oil | 49.3 | 48.8 |
| 5 | CH₃–⌬– | CH₃–⌬–OH | Et₃N | 91–92.5 | 49.3 | 48.9 |
| 6 | Cl–⌬– | Cl–⌬–OH | Et₃N | 91.5–93 | 55.8 | 55.8 |
| 7 | Cl,Cl–⌬–Cl | Cl,Cl–⌬(OH)–Cl | Et₃N | 109–10 | 63.1 | 62.6 |
| 8 | t-C₄H₉–⌬– | t-C₄H₉–⌬–OH | N-methylmorpholine | 106–108.5 | 44.0 | 43.5 |
| 9 | naphthyl | naphthol | do | 80–82 | 44.7 | 40.0 |

*Example 10.—Reaction of 3-(2,4,5-trichlorophenoxy)-2,4,4,5,5-pentachloro-2-cyclopentenone with a base to prepare corresponding ring-opening product*

Cl₂C=CCl, Cl₂C—O—(C₆H₂Cl₃) + NaOH → CCl₃=CCl—C=CClCOOH with O-(2,4,5-trichlorophenyl) + HCl (Compound 7)

22.5 parts of compound 7 + 4000 parts of water and 75 cc. of ten percent sodium hydroxide is heated to 60 degrees centigrade. The sodium hydroxide insoluble is filtered off and the resulting clear solution is acidified with concentrated hydrochloric acid. A solid forms which melts at 149 to 150 degrees centigrade after crystallization from a hexane-benzene solution.

*Analysis.*—Calcd. for $C_{11}H_3Cl_7O_3$: Neutralization equivalent, 431.5. Found: Neutralization equivalent by titration with 0.1-N NaOH to phenolphthalein end point, 432.

*Example 12.—Preparation of 1-phenoxy-2,4,4-trichlorocyclopentene-3-5-dione*

A mixture containing 117 parts of tetrachloro-4-cyclopentene-3-dione and 250 cc. of phenol is added to a solution containing 51 parts of N-methylmorpholine in 250 cc. phenol. This mixture is heated for 48 hours on a steam bath. The excess phenol is distilled off then the remaining material is dissolved in 250 parts of benzene and the salts are filtered off. The benzene solution is evaporated and the remaining contents distilled. The boiling point of the material is 129 to 132 degrees centigrade at 0.25 mm. The distilled material solidified. Melting point after crystallization from hexane, 57–9 degrees centigrade.

*Analysis.*—Calcd. for $C_{11}H_5Cl_3O_3$: Cl, 36.6. Found: 35.9.

In general, the compounds of the invention exhibit fungicidal properties and bactericidal properties, as shown below:

*Example 13*

Tomato plants infected with spores of *Alternaria solani*, the fungus responsible for early blight disease, were sprayed with aqueous dispersions of various of the chemicals of the invention at 0.01 percent concentration. Other infected plants were left unsprayed as controls. At a time when symptoms of early blight disease had developed on the untreated plants, essentially complete control of the disease was observed on those plants treated with the following:

3(β-naphthoxy)-2,4,4,5,5-pentachloro-2-cyclopentenone.
3(p-tert-butylphenoxy)-2,4,4,5,5-pentachloro-2-cyclopentenone.
3(pentachlorophenoxy)-2,4,4,5,5-pentachloro-2-cyclopentenone.
1-phenoxy-2,4,4-trichlorocyclopentene-3,5-dione.

*Example 14*

Nutrient agar treated with 1-phenoxy-2,4,4-trichlorocyclopentene-3,5-dione at 0.02 percent was inoculated with spores of *Staphylococcus aureus* and *Escherichia coli* bacteria. No bacterial growth occurred although the agar without the chemical supported vigorous growth of both species.

*Example 15*

The acid product prepared by the method outlined in Example 10 was applied to a mixed population of seedlings of ragweed, lambsquarters, millet, and pigweed at the rate of 16 pounds per acre (dispersed in water). After three days, substantially complete kill of these weeds was observed.

What is claimed is:

1. A compound selected from the group consisting of compounds of the formula:

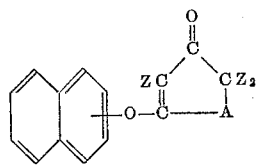

and compounds of the formula:

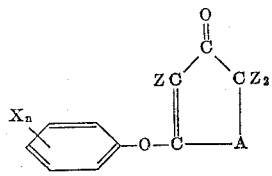

wherein Z is a halogen of atomic weight between 35 and 81, A is selected from the group consisting of $CZ_2$ and $C=O$, X is selected from the group consisting of halogen, nitro, alkyl, phenyl, alkoxy and carboxy and $n$ is from zero to five.

2. A compound according to claim 1 wherein Z is chlorine and X is present.
3. A compound according to claim 1 wherein X is present and is chlorine.
4. A compound according to claim 2 wherein X is chlorine.
5. A compound according to claim 1 wherein X is present and is nitro.
6. A compound according to claim 1 wherein A is $CCl_2$.
7. A compound according to claim 1 wherein A is $C=O$.
8. 3-(2,4 - dichlorophenoxy) - 2,4,4,5,5 - pentachloro-2-cyclopentenone.
9. 3-(beta-naphthoxy)-2,4,4,5,5-pentachloro - 2 - cyclopentenone.
10. 3-(pentachlorophenoxy)-2,4,4,5,5 - pentachloro - 2-cyclopentenone.
11. 1-phenoxy-2,4,4-trichlorocyclopentene-3,5-dione.

12. A process for preparing a compound selected from the group consisting of compounds of the formula:

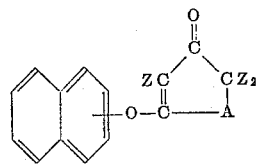

and compounds of the formula:

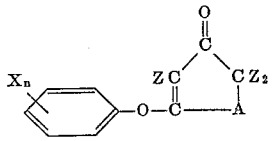

wherein Z is a halogen of atomic weight between 35 and 81, A is selected from the group consisting of $CZ_2$ and $C=O$, X is selected from the group consisting of halogen, nitro, alkyl, phenyl, alkoxy and carboxy and $n$ is from zero to five, which comprises reacting in the liquid phase a ketone of the structure

with a phenol of structure selected from the group consisting of:

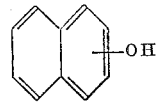

and

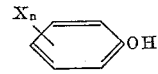

respectively, in the presence of a base and separating the product from the reaction mixture.

13. The process of claim 12 in which the ketone is tetrachlorocyclopentene-3,5-dione.
14. The process of claim 12 in which the ketone is hexachloro-2-cyclopentenone.
15. The process of claim 12 in which the reaction is conducted in the presence of about one mole of an acid acceptor per mole of phenolic compound.
16. The process of claim 15 in which the reactants are reacted at from about room temperature up to about 200° C.
17. A process according to claim 12 wherein the base is an alkali metal hydroxide.
18. A process according to claim 12 wherein the reaction is conducted in a solvent.
19. A process according to claim 12 wherein the base is N-methyl morpholine.
20. A process according to claim 12 wherein the base is triethylamine.

References Cited

UNITED STATES PATENTS

| | | | |
|---|---|---|---|
| 2,919,223 | 12/1959 | Baker | 167—30 |
| 2,922,742 | 1/1960 | Gruenhager | 167—30 |
| 2,969,397 | 1/1961 | Guex | 260—590 |
| 3,004,070 | 10/1961 | Hartlle | 260—590 |
| 3,060,236 | 10/1962 | Kollar | 260—590 |

OTHER REFERENCES

Cited in Chem. Abs. 55, 18767–18768 (1961).
Roedig et al., Liebig's Annalen 636, 1–18 (1960).
Zincke et al., Liebig's Annalen 437, 86–105 (1924).

LEON ZITVER, *Primary Examiner.*

JULIAN S. LEVITT, *Examiner.*

D. D. HORWITZ, *Assistant Examiner.*

UNITED STATES PATENT OFFICE
CERTIFICATE OF CORRECTION

Patent No. 3,347,929                                           October 17, 1967

Edward D. Weil et al.

It is certified that error appears in the above identified patent and that said Letters Patent are hereby corrected as shown below:

Columns 5 and 6, in the table, third column, line 1 thereof, "$C_6H_5ON$" should read -- $C_6H_5OH$ --.

Signed and sealed this 3rd day of March 1970.

(SEAL)
Attest:

Edward M. Fletcher, Jr.                           WILLIAM E. SCHUYLER, JR.
Attesting Officer                                         Commissioner of Patents